United States Patent [19]  
Tang

[11] Patent Number: 4,515,820  
[45] Date of Patent: May 7, 1985

[54] METHOD FOR COATING AND INFUSING NUT PRODUCTS WITH HONEY-SUCROSE SOLUTION FOR ROASTING

[76] Inventor: Charlene Tang, 2300 Wilcrest #78, Houston, Tex. 77042

[21] Appl. No.: 450,219

[22] Filed: Dec. 16, 1982

[51] Int. Cl.$^3$ ............................................. A23L 1/36
[52] U.S. Cl. ............................. 426/309; 426/93; 426/632
[58] Field of Search ............... 426/309, 305, 93, 629, 426/632, 639

[56] References Cited

U.S. PATENT DOCUMENTS

| | | | |
|---|---|---|---|
| 2,333,442 | 11/1943 | Rex | 426/309 |
| 3,184,316 | 5/1965 | Doan et al. | 426/303 |
| 4,089,984 | 5/1978 | Gilbertson | 426/93 |
| 4,161,545 | 7/1979 | Green et al. | 426/293 |

OTHER PUBLICATIONS

Barnett, The Art & Science of Candy Manufacturing, published by Books for Industry Division of Magazines for Industry, Inc., N.Y., N.Y., 1978, (pp. 187–199).

*Primary Examiner*—George Yeung  
*Attorney, Agent, or Firm*—Pravel, Gambrell, Hewitt & Kimball

[57] ABSTRACT

A method for coating and infusing nut products with honey-sucrose solution for roasting, which method consists essentially of the steps of (1) preparing a solution comprising 50%–70% by weight sucrose, 10%–20% by weight honey and the balance water, (2) heating the solution to no greater than the soft-ball stage, (3) coating shelled nuts with the solution until the nuts become at least partially saturated with the solution, (4) drying the coated nuts at least to where there is no excess solution left to interrupt a subsequent roasting process, and (5) roasting the coated nuts until they have a golden brown transparent glaze.

7 Claims, No Drawings

METHOD FOR COATING AND INFUSING NUT PRODUCTS WITH HONEY-SUCROSE SOLUTION FOR ROASTING

BACKGROUND OF THE INVENTION

This invention relates to a method for coating and infusing nuts with a honey-sucrose solution to enhance their flavor and provide them with an appetizing appearance and, more particularly, for providing a roasted nut product with a transparent outer coating of a honey and sucrose mixture to produce a shiny, crisp product and infusing the nut with the mixture to sweeten its flavor and provide a crunchier texture.

Honey has been used as a coating for nuts. One such coating known in the art is in the form of a shell or crust over the nut. For example, U.S. Pat. No. 4,161,545 teaches the use of honey and water as a base coating. An additional coating of sugar and starch is added to the nuts to produce a rough, uneven outer layering effect on the nuts. It has been found that a crust or shell is formed over the nuts with this type of process which does not provide a shiny, transparent exterior with a crispy texture that many consumers desire. Further, this type of process does not allow the honey and sucrose to saturate or penetrate the nuts to enhance the flavor inside the nut and provide the interior with a crunchier texture.

SUMMARY OF THE INVENTION

A type of coated nut more in accordance with the tastes of many consumers has been developed in accordance with the invention. The nuts are first shelled and then coated with a honey and sucrose solution which is also partially absorbed into the nuts. After the solution has dried to at least the tacky stage, the nuts are roasted by being deep fried in hot oil until they are a golden brown. Other roasting methods can also be used. The combination of a honey and sucrose solution which is provided both outside and inside the nuts imparts a fuller, richer flavoring. The honey browns the nuts to a nicer, more appealing coloration and the sucrose gives the product a sweetness that enhances the nut taste as well as provides a less sticky product than if honey were the only ingredient used.

The honey and sucrose solution tends to penetrate the external surface to impart a fuller, sweeter flavor to the nuts and make the interior crispier and crunchier than normal after roasting. However, the sweetness does not cover up the nut taste which is still predominant. The surface of the nut is coated with a glaze which is transparent and enhances its visual appearance and makes it more appetizing.

A small quantity of cream of tartar can be added to the solution for providing a smoother appearance by preventing crystallization of the ingredients. To obtain a slightly different consistency of the syrup, other agents of natural or derived vegetable gums such as malto-dextrins, dextrins, natural or derived edible polymers, gum arabic, cellulose derivatives, guar, etc. may be used without changing the final product by a significant amount.

The coating step can be performed by immersing the nuts in the solution, which is heated to the soft-ball stage, for a period of time which varies depending on the type of nut which is being coated. Softer nuts such as pecans should only be immersed until they are coated evenly and then should be withdrawn, while harder nuts such as walnuts and almonds can remain immersed for longer periods of time. In all cases, the nuts become partially saturated or infused with the solution while being coated. For the softer nuts, the coating step can be satisfactorily performed without immersing the nuts in the solution. Instead, the heated solution can be poured over the nuts.

All types of nuts can be treated by this process, including pecans, walnuts, almonds and peanuts. The skins are usually left on and treated to remove the natural bitterness of the skins. However, the process is applicable to bleached nuts as well.

After the roasting process, the nuts are preferably packaged and sealed in airtight containers using vacuum packing techniques with an inert gas such as nitrogen to preserve the freshness of the product.

EXAMPLES OF PREFERRED EMBODIMENTS

EXAMPLE 1—PECANS

Pecans are washed in cold water. A syrup containing by weight 50–70% sugar, 10–20% honey, 2–4% salt, 1–2% cream of tartar and the balance water, is heated to a temperature of 200°–220° F. or until the syrup has thickened to the soft-ball stage. The temperature is lowered 5°–10° and the pecans are immersed into the syrup until they are evenly coated. The pecans are taken out of the syrup and left to dry to a sticky/semi-dry, e.g. tacky, state or until there is no excess syrup to interrupt the roasting process. They are then completely immersed in oil at a temperature of 310°–400° F. and fried until golden brown. The frying operation usually takes from 4–6 minutes. The nuts are cooled so that no further roasting takes place. Excess oil is quickly wiped away and nuts are immediately packaged in airtight containers.

EXAMPLE 2—WALNUTS

Walnuts are poured into a boiling water solution containing 1% baking soda where the walnuts are boiled for 5 minutes. This removes the bitterness in the skin. The walnuts are then rinsed off with cold water. A syrup containing by weight 50–70% sugar, 10–20% honey, 2–4% salt, 1–2% cream of tartar and the balance water, is heated to a temperature of 200°–220° F. or until the syrup has thickened to the soft-ball stage. The walnuts are poured into the syrup and left to boil for 20–30 minutes. The nuts are then removed from the syrup solution and left to dry to a sticky/semi-dry, e.g. tacky, state or until there is no excess syrup to interrupt the roasting process. The nuts are then completely immersed in oil at a temperature of 310°–400° F. and fried until golden brown. The frying operation usually takes from 4–6 minutes and nuts are cooled so that no further roasting takes place. Excess oil is quickly wiped away and nuts are immediately packaged in airtight containers.

EXAMPLE 3–ALMONDS

Almonds are washed in cold water. A syrup containing by weight 50–70% sugar, 10–20% honey, 2–4% salt, 1–2% cream of tartar and the balance water, is heated to 200°–220° F. or until the syrup has thickened to the soft-ball stage. The almonds are then poured into the syrup and boiled for 5–10 minutes. They are taken out and left to dry to a sticky/semi-dry, e.g. tacky, state or when no excess syrup is left to interrupt roasting process. They are completely immersed in oil at 310°–400°

F. and roasted until golden brown. The frying operation usually takes from 4–6 minutes. Nuts are cooled so that no further roasting takes place. Excess oil is quickly wiped away and nuts are immediately packaged in airtight containers.

What is claimed is:

1. A method for preparing nut products by applying a crispy, golden-brown glaze to the outer surface, consisting essentially of the steps of:
   (a) preparing a solution comprising 50%–70% by weight sucrose, 10%–20% by weight honey and the balance water;
   (b) heating said solution to no greater than the softball stage;
   (c) coating shelled nuts with said solution until the nuts become at least partially saturated with the solution;
   (d) drying the coated nuts at least to where there is no excess solution left to interrupt a subsequent roasting process;
   (e) roasting the coated nuts until they have a golden brown transparent glaze.

2. The method of claim 1, wherein said solution is heated to 200°–220° F.

3. The method of claim 1, wherein the coating step includes immersing the nut products in the solution.

4. The method of claim 3, wherein for softer nuts the solution is heated to 200°–220° F. and then lower 5°–10° and the nuts are immersed until evenly coated and then removed.

5. The method of claim 3, wherien for harder nuts the solution is heated to 200°–220° F.

6. The method of claim 1, wherein step (e) includes immersing the coated nut products in oil at a temperature of 310°–400° F.

7. The method of claim 1, wherein step (d) includes drying the coated nuts until the solution is tacky.

* * * * *